United States Patent [19]

Hawkins et al.

[11] Patent Number: 5,707,734

[45] Date of Patent: Jan. 13, 1998

[54] GLASS FIBERS HAVING FUMED SILICA COATING

[75] Inventors: Christopher M. Hawkins, Alexandria; Robert A. Schweizer, Granville, both of Ohio

[73] Assignee: Owens-Corning Fiberglas Technology Inc., Summit, Ill.

[21] Appl. No.: 459,956

[22] Filed: Jun. 2, 1995

[51] Int. Cl.$^6$ ...................................................... B32B 7/00
[52] U.S. Cl. ..................... 428/372; 428/375; 428/378; 428/392; 523/200; 523/209; 523/214; 523/217
[58] Field of Search .......................... 428/372, 392, 428/368, 375, 378; 523/209, 217, 214, 200

[56] References Cited

U.S. PATENT DOCUMENTS

| | | | |
|---|---|---|---|
| 2,022,750 | 12/1935 | Toohey | 49/77.5 |
| 2,885,308 | 5/1959 | Healy | 428/372 |
| 3,131,087 | 4/1964 | Paquet | 428/372 |
| 3,262,767 | 7/1966 | Wang | 65/31 |
| 3,377,233 | 4/1968 | Jackson | 428/372 |
| 3,616,030 | 10/1971 | Jumentier et al. | 156/285 |
| 3,715,230 | 2/1973 | Sadler | 162/153 |
| 3,965,020 | 6/1976 | Noll et al. | 428/372 |
| 3,969,567 | 7/1976 | Occleshaw et al. | 428/372 |
| 4,018,964 | 4/1977 | Otouma et al. | 428/372 |
| 4,332,852 | 6/1982 | Korklan et al. | 428/331 |
| 4,347,278 | 8/1982 | Flautt et al. | 428/288 |
| 4,543,287 | 9/1985 | Briggs et al. | 428/372 |
| 4,686,135 | 8/1987 | Obayashi et al. | 428/379 |
| 4,694,031 | 9/1987 | Morita et al. | 523/203 |
| 4,714,650 | 12/1987 | Obayashi et al. | 428/265 |
| 4,772,655 | 9/1988 | Krishman et al. | 524/437 |
| 4,990,549 | 2/1991 | Delvin et al. | 523/209 |
| 5,071,891 | 12/1991 | Harrison et al. | 523/209 |
| 5,075,354 | 12/1991 | Mitsuuchi et al. | 523/217 |
| 5,429,869 | 7/1995 | McGregor et al. | 428/364 |

*Primary Examiner*—Patrick Ryan
*Assistant Examiner*—J. M. Gray
*Attorney, Agent, or Firm*—C. Michael Gegenheimer; Inger H. Eckert

[57] ABSTRACT

A composite having enhanced flame retardant behavior includes a polymer and glass fibers coated with fumed silica. The composite can be based on a wide variety of polymers such as polybutylene and polyethylene terephthalates, polycarbonates, polyethylenes, polypropylenes and nylons. The glass fibers are also preferably coated with fibrillar polytetrafluoroethylene.

13 Claims, No Drawings

GLASS FIBERS HAVING FUMED SILICA COATING

TECHNICAL FIELD

This invention relates in general to flame retardant additives for use in composites, and in particular to glass fibers coated with fumed silica for use in composites to enhance their flame retardant behavior.

BACKGROUND

Composite materials are used to manufacture a wide variety of different products. It is sometimes desirable for the composites to possess flame retardant properties to reduce the risk in case of fire. Since composites by themselves are not always resistant to flames, a flame retardant can be added to composites to enhance their flame retardant behavior.

Fumed silica is an effective flame retardant additive. Unfortunately, fumed silica is very dusty and, as a result, its use in standard compounding operations such as manufacturing composites has been precluded.

Thus, it would be desirable to provide fumed silica in a form whereby it can be used as a flame retardant in compounding operations such as the manufacturing of composites. It would particularly be desirable to provide a form of fumed silica which will reduce or eliminate the dust problem caused by conventional fumed silica.

DISCLOSURE OF INVENTION

This invention relates to a composite having enhanced flame retardant behavior. The composite includes a polymer and glass fibers coated with fumed silica. The composite can be based on a wide variety of polymers such as polybutylene and polyethylene terephthalates, polycarbonates, polyethylenes, polypropylenes and nylons.

The present invention overcomes the dust problem associated with fumed silica, and allows the fumed silica to be used as a flame retardant in the manufacture of composites. It has now been discovered that binding the fumed silica to glass fibers will reduce or eliminate the dust caused by the fumed silica.

In addition to the fumed silica, the glass fibers are also preferably coated with fibrillar TEFLON. It has been discovered that the fumed silica exhibits a synergistic effect in enhancing flame retardant behavior when it is used in combination with fibrillar TEFLON in the composites.

Various objects and advantages of this invention will become apparent to those skilled in the art from the following detailed description of the preferred embodiment.

BEST MODE FOR CARRYING OUT THE INVENTION

The present invention provides glass fibers coated with fumed silica and optionally fibrillar TEFLON for use in composites having enhanced flame retardant behavior.

Any conventional process can be used to manufacture the glass fibers. For example, the manufacturing can involve a process in which a plurality of individual or monofilament glass fibers, substantially contemporaneous with forming are brought into contact with an applicator wherein a size is applied to the glass fibers. The sized glass fibers are then wound into a package and the package is dried. Another process involves attenuating the glass fibers with a rotary device to produce a downwardly falling stream of fibers which are collected on a conveyor. Glass fibers made by these processes are commercially available from Owens-Corning Fiberglas Corporation, Toledo, Ohio.

The glass fibers can have an average length between about 3 mm and about 130 mm, preferably between about 3 mm and about 25 mm, more preferably between about 3 mm and about 10 mm, and most preferably between about 3 mm and about 6 mm. They can have an average diameter between about 7 microns and about 25 microns, preferably between about 8 microns and about 20 microns, and most preferably between about 10 microns and about 14 microns.

Preferably the glass fibers are employed at a level between about 10% and about 50% by weight of the composite, more preferably at a level between about 20% and about 40%, and most preferably at a level between about 25% and about 35%. At levels below about 10% the glass fibers coated with fumed silica have very little flame retardant effect in the composite. Levels of about 50% are the maximum achievable from a process standpoint.

The fumed silica (silicon dioxide) used to coat the glass fibers is a form of silica made during burning silicon tetrachloride in air (i.e., by the flame hydrolysis of silicon tetrachloride). Preferably the fumed silica has an average particle size of up to 10 microns, more preferably between about 1 and about 50 nanometers, and has a purity of 99.8% or greater (as $SiO_2$).

Preferably the fumed silica is used at a level between about 0.5% and about 10% by weight of the glass, and more preferably at a level between about 1% and about 6%.

If desired, the fumed silica can be treated before use in the composite, for easier processing and/or improved properties in the composite. For example, the fumed silica can be treated with octamethylcyclotetrasiloxane and then hexamethyldisilazane.

In addition to the fumed silica, the glass fibers are also preferably coated with fibrillar TEFLON (polytetrafluoroethylene). Fibrillar TEFLON is the type that forms fibrils upon the application of shear. It is available commercially as ASTM-Type 3 TEFLON from E. I. duPont de Nemours & Company, Wilmington, Del. Fibrillar TEFLON will adhere to the glass fibers while other forms of TEFLON such as granular TEFLON will not.

The fibrillar TEFLON can also be added directly to the composite, instead of as a coating on the glass fibers. If desired, the fibrillar TEFLON can be added both directly and as a coating. The fumed silica has been found to exhibit a synergistic effect in enhancing flame retardant behavior when it is used in combination with fibrillar TEFLON in the composites, when the fibrillar TEFLON is used either as a coating on the glass fibers or added directly to the composite. Preferably at least a portion of the fibrillar TEFLON is applied as a coating.

The total amount of fibrillar TEFLON in the composite, including fibrillar TEFLON coated on the glass fibers and fibrillar TEFLON added directly to the composite, is preferably between about 0.01% and about 5% by weight of the composite, and more preferably between about 0.05% and about 1% by weight of the composite.

The fumed silica and optionally fibrillar TEFLON can be applied as a coating on the glass fibers in a variety of ways. For example, they can be applied during the fiber forming operation as a size composition using any suitable sizing applicator (e.g., the applicator of U.S. Pat. No. 3,498,262). When the glass fibers are formed, the applicator applies the coating to the fibers from a coating bath. The fumed silica and optionally fibrillar TEFLON can also be applied as a coating on the fibers in a post treatment process after the fibers are formed. For example, they can be sprayed on or tumbled with the glass fibers and a binder material.

After application of the fumed silica and optionally fibrillar TEFLON to the glass fibers, the coated fibers can be collected by any convenient means. If desired, the coated fibers can be heated to remove water.

Polymers comprise the matrix of the composites of the present invention. Any of a wide variety of polymers can be used, including polymers selected from polybutylene and polyethylene terephthalates, polycarbonates, polyethylenes, polypropylenes, nylons, and mixtures of these polymers. Preferably the polymers are thermoplastic resins. Suitable thermoplastic polyester resins such as polybutylene terephthalates and polyethylene terephthalates are disclosed in U.S. Pat. No. 5,075,354 assigned to Polyplastics Company, Ltd., issued Dec. 24, 1991; and U.S. Pat. No. 4,990,549 assigned to General Electric Company, issued Feb. 5, 1991. Polycarbonate resins suitable for use in the invention are disclosed in U.S. Pat. No. 4,772,655 assigned to Mobay Corporation, issued Sep. 20, 1988. The polymers can also include oligomers to fine tune the properties of the composite.

The mount of polymer is preferably between about 40% and about 90% by weight of the composite, more preferably between about 55% and about 80%, and most preferably between about 65% and about 75%.

Conventional additives or other flame retardant materials can also be added to the composites, typically at levels up to about 10%, and preferably at levels up to about 5%. The type and amount of additional flame retardant additives is dependent upon the particular matrix polymer, glass loading, and degree of flame retardance required. Illustrative flame retardant additives are disclosed in U.S. Pat. Nos. 3,833,685; 3,341,154; 3,915,926; 3,671,487; 3,681,281; 3,557,053; and 3,830,771.

The conventional additives can include dyes or pigments, stabilizers, antioxidants, lubricants, ultraviolet absorbers, nucleating agents, and organic or inorganic fillers such as talc, calcium carbonate, mica, barium sulfate, kaolin, or zeolite.

The process to make the composite involves melting the polymer and mixing in the coated glass fibers and any other additives. A convenient process is to use an extruder to melt and compound the components. A suitable single screw extruder is made by HPM Company, Marlon, Ohio. A suitable twin screw extruder is made by Werner & Pfleiderer, Ramsey, N.J. The finished composite exits the extruder in the form of pellets. An injection molding machine can be used to re-melt the pellets and mold the composite into specific desired finished parts.

EXAMPLE I

Melt extrude a blend of 70 parts of polybutylene terephthalate, 9 parts of 2,4,6-tribromophenol terminated tetrabromobisphenol A carbonate oligomer, 30 parts of glass fibers coated with fumed silica, 3 parts of antimony oxide, and 0.2 parts of fibrillar TEFLON. The glass fibers are coated with 3.3% fumed silica by weight of the glass. The glass fibers have an average length of 4 mm and an average diameter of 14 microns. The fumed silica can optionally be pre-treated with octamethylcyclotetrasiloxane and then with hexamethyldisilazane.

This composite will have enhanced flame retardant behavior compared to a composition in which the glass fibers are not coated with the fumed silica.

EXAMPLE II

Melt extrude a blend of 70 parts of polybutylene terephthalate, 9 parts of 2,4,6-tribromophenol terminated tetrabromobisphenol A carbonate oligomer, 30 parts of glass fibers coated with fumed silica and fibrillar TEFLON, 3 parts of antimony oxide, and 0.2 parts of fibrillar TEFLON. The glass fibers are coated with 3.3% fumed silica by weight of the glass and 0.66% fibrillar TEFLON by weight of the glass. The glass fibers have an average length of 4 mm and an average diameter of 14 microns. The fumed silica can optionally be pre-treated with octamethylcyclotetrasiloxane and then with hexamethyldisilazane.

This composite will have enhanced flame retardant behavior compared to a composition in which the glass fibers are not coated with the fumed silica and fibrillar TEFLON.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

INDUSTRIAL APPLICABILITY

The invention is useful in making glass fibers for flame retardant composites.

What is claimed is:

1. A flame-retardant fiber-reinforced composite comprising:
   a matrix material comprising a polymer; and
   glass fibers having a coating comprising fumed silica thereon forming coated glass fibers, wherein the glass fibers have an average length between about 3 mm and about 130 mm and an average diameter between about 7 microns and about 25 microns.

2. A composite according to claim 1, wherein said coated glass fibers are present in said composite in an amount of from about 10% to about 50% by weight of the composite.

3. A composite according to claim 1, wherein said fumed silica is coated on said glass fibers in an amount of from about 0.5% to about 10% by weight of the glass fibers.

4. A composite according to claim 1, further comprising fibrillar polytetrafluoroethylene in an amount of from about 0.01% to about 5% by weight of the composite.

5. A composite according to claim 1, wherein said coating further comprises fibrillar polytetrafluoroethylene.

6. A composite according to claim 1, wherein said polymer is a thermoplastic resin.

7. A composite according to claim 1, wherein said polymer is selected from the group consisting of polybutylene and polyethylene terephthalates, polycarbonates, polyethylenes, polypropylenes, nylons, and mixtures thereof.

8. A composite according to claim 1, wherein said polymer is present in an amount of from about 40% to about 90% by weight of the composite.

9. A composite according to claim 1, wherein said average length of the glass fibers is between about 3 mm and about 25 mm.

10. A composite according to claim 1, wherein said fumed silica has an average particle size of up to 10 microns.

11. A composite according to claim 10, wherein said coated glass fibers are present in an amount of from about 20% to about 40% by weight of the composite.

12. A composite according to claim 1, wherein said fumed silica has been treated with octamethylcyclotetrasiloxane and hexamethyldisilazane.

13. A flame-retardant fiber-reinforced composite comprising from about 65% to about 75% by weight polybutylene terephthalate as a matrix material and from about 25% to to about 35% by weight of coated glass fibers, said coated glass fibers comprising fibers of a glass material and a coating thereon comprising fumed silica and fibrillar polytetrafluoroethylene, wherein the fibers have an average length between about 3 mm and about 6 mm and an average diameter between about 10 microns and about 14 microns, the timed silica is present in an amount of from about 1% to about 6% by weight of the fibers, and the fibrillar polytetrafluoroethylene is present in an amount of from about 0.05% to about 1% by weight of the composite.

* * * * *